Aug. 28, 1956     C. C. FOGG ET AL     2,760,516
FLOAT OPERATED VALVES
Filed Feb. 21, 1951
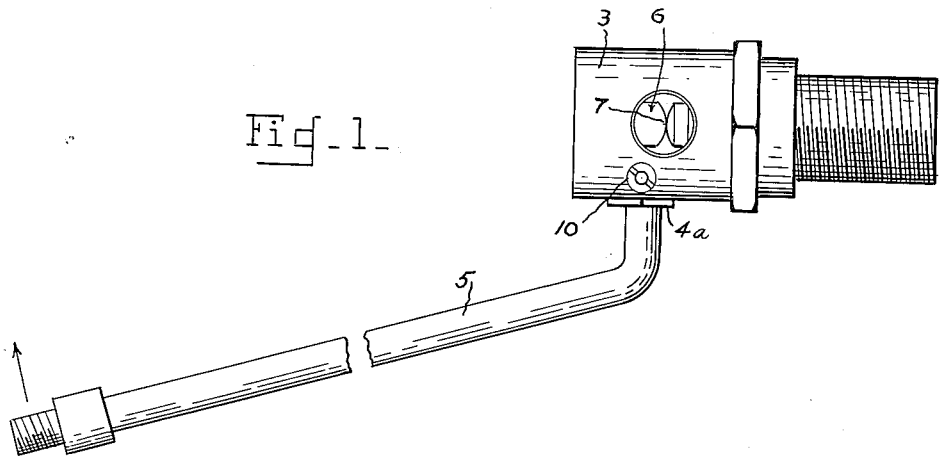
Fig_1_
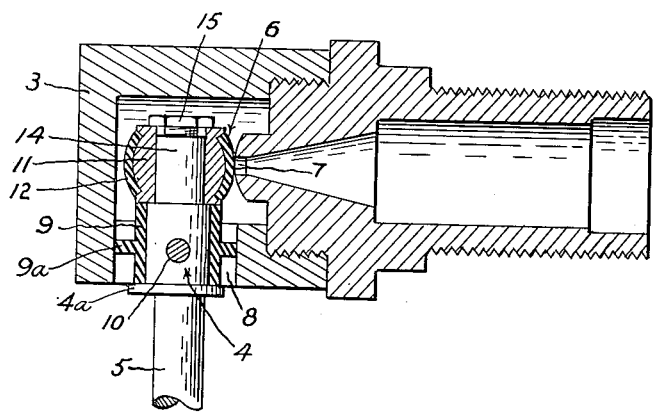
Fig_2_
INVENTOR:
Clifford C. Fogg
Harold P. Sinclair,
BY
ATTORNEY

United States Patent Office 2,760,516
Patented Aug. 28, 1956

2,760,516

FLOAT OPERATED VALVES

Clifford Cyril Fogg and Harold Patrick Sinclair, Armadale, Victoria, Australia

Application February 21, 1951, Serial No. 211,992

Claims priority, application Australia February 27, 1950

1 Claim. (Cl. 137—329.05)

The present invention relates to float operated vales and is particularly concerned with float operated valves for flushing cisterns or the like.

Hitherto float operated valves for flushing cisterns and the like apparatus have not been entirely satisfactory, due principally to their relatively large number of loosely connected parts.

For example the float arm including the slide operating cam are usually adapted to be hingeably attached to the valve body by means of a split pin or the like with the result that a relatively loose connection is obtained between this unit and its associated valve slide and the valve body. This results in a somewhat insecure seal when the cistern is full of water and in most cases objectionable noises are generated as the valve nears closure.

A further disadvantage of float operated valves hitherto in use is that they frequently permit the water to flow into the cistern with a disagreeable hammering or whistling sound.

It is the primary object of the present invention to overcome the above mentioned disadvantages.

In order that the invention may be understood reference will now be made to the accompanying drawings in which:

Figure 1 is a side elevation of a float operated valve according to a practical embodiment of the invention and Figure 2 is a sectional view of the valve of Figure 1.

The float operated valve shown in the drawings comprises a valve body 3 forming a valve chamber, a valve stem 4 to which a float arm 5 is attached in any suitable manner. A valve closure member, hereinafter referred to as a seal 6, is provided on the valve stem 4 to open and close the inlet in the valve seat 7 through which water may flow into the cistern tank.

According to the invention, means are provided resiliently resisting pivotal movement of the valve stem 4 within an opening 8 provided in the valve body 3. In addition, the valve stem 4 and seal 6 are of unitary construction, thus avoiding the use of a number of relatively loosely connected parts.

In the practical embodiment of the invention shown in the drawings the valve stem 4 is provided with a flange 4a whereby a neck is formed at a position immediately above the junction between the float arm 5 and the valve stem 4 which neck is adapted to receive a collar 9 composed of rubber or other suitable resilient material. The collar 9 is provided with an external flange 9a which fits snugly within the opening 8 provided in the valve body 3 thereby to cushion the movements of the valve stem 4 within the valve body.

The valve stem 4 is hingeably attached to the valve body 3 by a threaded pin or the like 10 for which purpose the valve stem 4 and the collar 9 are provided with suitable transverse holes through which the pin 10 is passed.

The seal 6 for the valve seat 7 comprises a flanged collar 11 that carries and retains a valve sealing ring 12 which may be of rubber or other resilient material. The sealing ring is preferably curved in contour as shown in the drawings. The flanged collar 11 is adapted to slip over a section 14 of reduced diameter of the valve stem 4 and is retained in position by a nut 15 which is screwed on to a screw thread at the end of the section 14.

In the operation of the float, the sealing ring 12 is brought into contact with, or removed from the valve seat 7, thereby to control the ingress of water into the cistern. The improved seal has the advantage that, as one particular part of the sealing ring 12 becomes somewhat worn it is possible to rotate the ring thereby to bring a fresh portion into position adjacent to the valve seat 7.

Furthermore, the flanged collar 11 may be readily removed from the valve stem 4 to permit the sealing ring 12 to be replaced.

Although a preferred embodiment of the invention has been described in the foregoing, it is to be understood that modifications, alterations and/or additions may be incorporated therein without departing from the spirit and scope of the invention as defined by the appended claim.

Having now described our invention, what we claim as new and desire to secure by Letters Patent is:

A valve for controlling the flow of fluid into a cistern, said valve comprising a valve body having a valve chamber with an inlet, an outlet and a valve seating surface surrounding said inlet, said body having an opening formed therein, a valve unit for insertion within said opening pivotally mounted on a pivot pin removably mounted in said opening, said valve unit comprising a valve stem and seal said stem having a section of reduced diameter adjacent one end for mounting said seal and a flange adjacent the other end defining the extent of a neck portion which receives said pivot pin, a resilient collar mounted on said neck portion and having a portion in abutting contact with the inner surface of the opening resiliently cushioning pivotal movement of said valve unit, said seal comprising a flanged collar removably secured to said section of reduced diameter and rotatably mounted thereon, a replaceable ring retained by said flanged collar for valving cooperation with said seating surface, releasable means for holding said collar against rotation, said opening having a transverse cross-section of uniform diameter which is not less than the corresponding diameter of the mounted ring whereby upon removal of the pivot pin from the body said valve unit may be removed through said opening as a unitary structure.

References Cited in the file of this patent

UNITED STATES PATENTS

| | | |
|---|---|---|
| 109,730 | Hanks | Nov. 29, 1870 |
| 647,848 | Lange | Apr. 17, 1900 |
| 674,696 | Gardenier | May 21, 1901 |
| 1,579,140 | Phillips | Mar. 30, 1926 |
| 1,959,259 | Zerk | May 15, 1934 |
| 2,121,553 | Stewart | June 21, 1938 |
| 2,365,105 | Perry | Dec. 12, 1944 |
| 2,608,207 | Le Van | Aug. 26, 1952 |

FOREIGN PATENTS

| | | |
|---|---|---|
| 280,340 | Great Britain | Nov. 17, 1927 |
| 624,406 | Germany | 1936 |
| 100,089 | Sweden | 1940 |
| 478,627 | Australia | Nov. 20, 1951 |